UNITED STATES PATENT OFFICE.

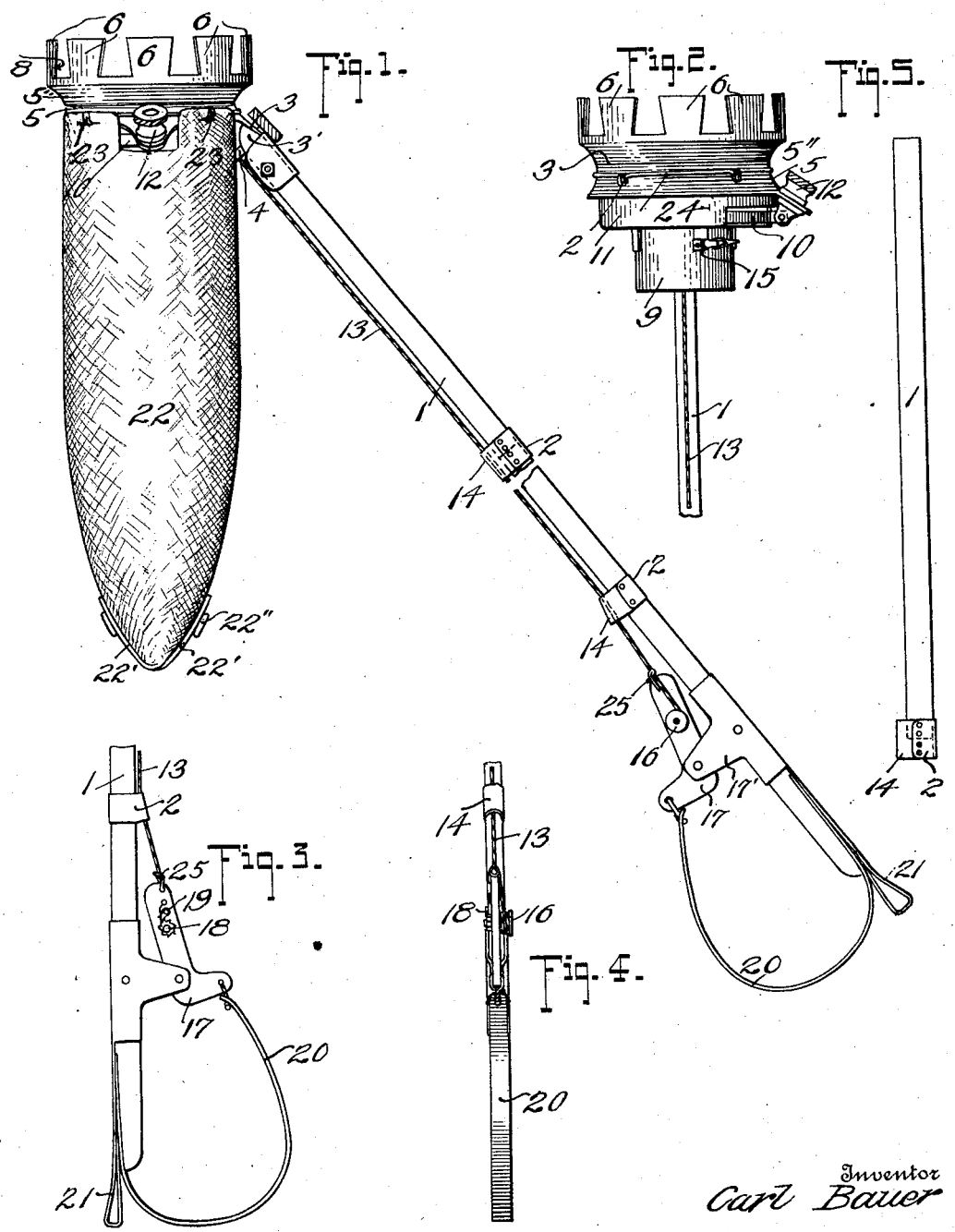

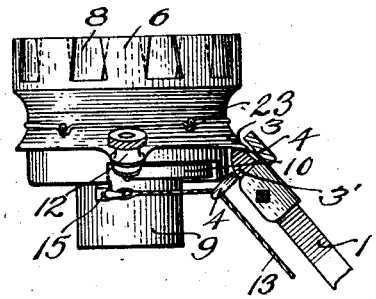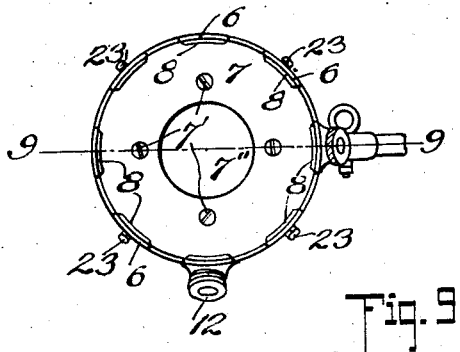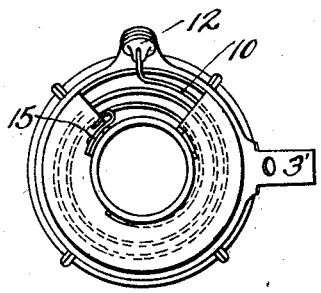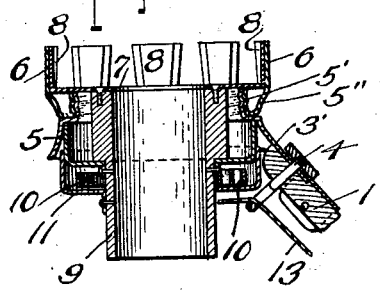

CARL BAUER, OF WOLFE, WEST VIRGINIA.

FRUIT-PICKER.

1,047,880.

Specification of Letters Patent. Patented Dec. 17, 1912.

Application filed March 11, 1912. Serial No. 682,915.

*To all whom it may concern:*

Be it known that I, CARL BAUER, a citizen of Austria-Hungary, residing at Wolfe, in the county of Mercer and State of West Virginia, have invented certain new and useful Improvements in Fruit-Pickers, of which the following is a specification.

This invention relates to improvements in fruit pickers and its primary object is to provide manually operable mechanical means whereby fruit may be easily and conveniently dislodged from trees and deposited in a receptacle without likelihood of breakage of the limbs.

Specifically, my picker embodies rotary cutting members carried at one end of a staff of suitable length, and operating means being connected therewith at its opposite end so that as the stems of the fruit are cut, the fruit falls through a hollow operating member into a receptacle located conveniently beneath the cutting elements.

For a full understanding of the present invention, reference is to be had to the following description and to the accompanying drawings, in which—

Figure 1 is a side elevation of a fruit picker constructed in accordance with my invention. Fig. 2 is a front elevation thereof with the bag removed and the staff broken away. Fig. 3 is a side view of the hand operated elements, looking at the same from the opposite side to Fig. 1. Fig. 4 is an end elevation of the same. Fig. 5 is a view of one of the sections of the staff. Fig. 6 is a side view of the cutting members, showing more clearly the cutting action of the rotary cutters. Fig. 7 is a top plan view. Fig. 8 is a bottom plan view. Fig. 9 is a vertical sectional view on the line 9—9 of Fig. 7.

Throughout the following detail description and on the several figures of the drawings, similar parts are referred to by like reference characters.

Referring to the drawings, my invention comprises a rod or staff 1, composed of a suitable number of sections secured together by means of the connecting members 2. Rigidly secured to the upper end of the staff 1 is the cutting mechanism comprising essentially a stationary member 3 formed with an extension 3' through which an eye-bolt 4 passes to removably connect it to the staff. While it is not essential, the stationary member 3 preferably consists of the lower section 5 which is fastened to the staff and has threaded connection, as indicated at 5', with the upper section 5'', as most clearly shown in Fig. 9 of the drawings.

The upper section 5'' of the stationary member 3 is formed with a plurality of spaced vertically and circumferentially arranged cutting blades 6, of dove-tailed shape, the opposite edges of which are sharpened.

Mounted within the section 5'' of the stationary member 3 is the movable rotary cutter 7 having the annular spaced cutting blades 8 of similar shape to the blades 6 and arranged to normally register with the position of said blades. The movable cutter 7 is fastened to the top of the tubular member or throat 9 by means of the screws 7' passing through the bottom of said cutter and an opening 7'' therethrough communicates with the hollow member 9. Normally tending to hold the cutter 7 in the position wherein its blades register with the blades of the stationary member 3, is provided a helical spring 10 surrounding the central portion of the throat 9 and contained within the annular casing 11 suitably secured to said throat, one end of said spring being secured to the tubular member and the other end to the post 12 on the stationary member 3. The casing is furthermore suitably cut away in order to permit movement of the movable cutting member, said movement being limited by the edges of the opening in the casing which are adapted to abut against the end of the spring 10, as shown in Fig. 8 of the drawings.

Referring specifically to the operating means for the cutting mechanism above described, I provide an operating cord 13 passing along the staff 1 therebeneath, through guide loops 14 connected with the connecting members 2 and the eye-bolt 4 at the upper end of the staff and connected at its upper end with the hooks 15 secured to the throat 9 adjacent to the casing 10. The lower end of the cord is wound around the adjusting reel 16 carried on one side of one arm of a bell crank lever 17, the pintle on which said reel is mounted having secured to it on the opposite side of the arm a rigid wheel 18. A spring actuated dog 19 permits proper adjustment of the operating cord 13 according to the number of sections which may be used in the staff, the number of sections being governed by the character of trees in connection with which the invention is being used. Connected to the other arm of the lever 17, which is pivotally mounted in a bracket 17' secured to the staff 1, is the arched or bowed spring 20, the opposite end of said spring being secured to the lower extremity of the staff 1, by any desired means, adjacent to the extension 21, which serves as a grip for the hand of the operator.

The operation of the invention will be readily understood by reference to the foregoing, in connection with the drawings. The operator places the cutting mechanism against the fruit which, if dislodged, will pass through the opening 7' and the tubular member 9 into a bag or receptacle 22 supported on hooks 23 formed on the ring or band 24 which is mounted on the reduced portion of the stationary member 3. If the fruit is not dislodged by contact of the implement therewith, the staff is manipulated so as to bring the stems of the fruit into the space between the blades 6 and 8, and by pressing inwardly on the spring 20, through the lever 17, cord 13 and member 9, the movable cutter is rotated affording a peculiar shearing action of the blades and severing the fruit from the stems. There are several advantages for the use of the dovetailed blades, among which are that of the peculiar shearing action above mentioned, due to their peculiar shape and the fact that there will be no tendency to shove the stems out in the operation of cutting since the opposing edges of said blades meet first at their top portion, effectively inclosing the stems in the spaces between the blades, as will be seen most clearly in Fig. 6. When the spring 20 is released, the movable cutter 7 assumes its normal position very quickly under the action of the springs 10 and 20.

The lower end of the bag 22 is provided with flap closures 22', held in closed positions by the buttons 22'' or similar fastenings, and when a sufficient quantity of fruit has been gathered, it may be easily removed from said bag by this arrangement.

Loosely mounted in the upper end of the bell crank lever 17 is a wire clamping member 25, through which the operating cord 13 passes, the purpose of said member being to hold the operating cord in its proper position for operation by the lever. The shape of the member 25 permits the cord to be slipped out from engagement therewith when it is necessary to remove the cord for any reason.

Having thus described the invention, what is claimed as new is:

1. In a fruit picker, a lower shell provided with a central opening and a laterally extending socket to one side of the same, a staff having its end fitting in the socket, a tube having both ends open and rotatably mounted in said central opening and guided in its rotation by the walls of the shell, a ring connected with the outer end of the rotatable tube and carrying cutting teeth, an upper shell having screw threaded engagement with the lower shell and provided with cutting teeth surrounding the first named cutting teeth, a spring to yieldingly oppose movement of the rotatable tube in one direction, and means to turn the tube in such direction in opposition to the spring.

2. In a fruit picker, an outer shell provided with a ring of spaced teeth of trapezoidal outline which increase in width outwardly, an inner element provided with a central opening and having a ring of spaced similar shaped teeth which increase in width outwardly and coöperate with the first named teeth, and means to move the inner element with relation to the outer shell, the central opening being disposed for permitting the discharge of the fruit therethrough.

3. The combination with cutting mechanism, of an extensible staff to support the same, a cord to operate the cutting mechanism, guides attached to the staff and receiving the cord therethrough, a bell-crank lever pivoted to the staff, a reel to receive the cord thereabout and rotatably mounted upon the bell-crank lever, a pawl and ratchet means to prevent improper rotation of the reel, a curved leaf spring secured upon the lower end of the staff and connected with the bell-crank lever in position for being compressed by the hand of the operator, and a grip extension connected with the staff and disposed near the curved leaf spring.

4. In a fruit picker, the combination of a sectional staff, a cutter removably secured to one end of said staff and comprising a stationary member and a movable member mounted within said stationary member, said members being each provided with spaced dove-tailed shaped cutting blades, a tubular operating member mounted in the cutter and connected with the movable member aforesaid, a spring normally holding the blades in register with each other, a casing for said spring secured to the operating member and adapted to limit the movements thereof, a receptacle mounted on the stationary member aforesaid to receive the fruit passing through the tubular member, operating mechanism carried by the staff at its lower end and comprising a bell crank lever mounted on the staff, an operating cord connecting one arm of the bell crank lever with the tubular operating member aforesaid, a reel carried by the said arm of the lever and upon which the operating cord is wound, and guide members carried by the staff through which the operating cord passes, and an arched spring to control the movement of said bell-crank lever connected with the other arm of the latter.

In testimony whereof I affix my signature in presence of two witnesses.

CARL BAUER.

Witnesses:
 RUDOLF IHNAT,
 TINCO PINTÉR.

Copies of this patent may be obtained for five cents each, by addressing the "Commissioner of Patents, Washington, D. C."